US012585758B2

(12) United States Patent
Teglia

(10) Patent No.: US 12,585,758 B2
(45) Date of Patent: Mar. 24, 2026

(54) ELECTRONIC SYSTEM AND METHOD FOR PREVENTING MALICIOUS ACTIONS ON A PROCESSING SYSTEM OF THE ELECTRONIC SYSTEM

(71) Applicant: THALES DIS FRANCE SA, Meudon (FR)

(72) Inventor: Yannick Teglia, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 17/055,434

(22) PCT Filed: May 2, 2019

(86) PCT No.: PCT/EP2019/061290
§ 371 (c)(1),
(2) Date: Nov. 13, 2020

(87) PCT Pub. No.: WO2019/219400
PCT Pub. Date: Nov. 21, 2019

(65) Prior Publication Data
US 2021/0224386 A1 Jul. 22, 2021

(30) Foreign Application Priority Data
May 16, 2018 (EP) ..................................... 18305602

(51) Int. Cl.
*G06F 21/55* (2013.01)
*G06F 21/54* (2013.01)
(Continued)

(52) U.S. Cl.
CPC ............ *G06F 21/554* (2013.01); *G06F 21/54* (2013.01); *G06F 21/566* (2013.01); *G06F 21/575* (2013.01); *G06F 21/86* (2013.01)

(58) Field of Classification Search
CPC ...... G06F 21/554; G06F 21/54; G06F 21/566; G06F 21/575; G06F 21/86; G06F 2221/2139; G06F 2221/2143
See application file for complete search history.

(56) References Cited

U.S. PATENT DOCUMENTS

| | | | |
|---|---|---|---|
| 9,727,726 B1 * | 8/2017 | Allen | ...................... G06F 21/53 |
| 9,941,880 B1 * | 4/2018 | Lesea | ................... H03K 19/003 |

(Continued)

FOREIGN PATENT DOCUMENTS

WO WO2016182650 A1 11/2016

OTHER PUBLICATIONS

PCT/EP2019/061290, Written Opinion of the International Searching Authority, May 16, 2019, European Patent Office, D-80298 Munich.

(Continued)

*Primary Examiner* — Trong H Nguyen

(57) ABSTRACT

An electronic system having a processing system with a hardware processor and at least one additional unit the hardware processor having a CPU register and the additional unit having a processing system memory. A secure enclave of the system is configured to monitor the behavior of the processing system and detect a compromise of the processing system. A protection system of the electronic system is configured, upon detection of a compromise of the processing system by the secure enclave, to perform at least one dedicated action on at least one additional unit among the additional units for raising an alert or for applying countermeasures, or on the hardware processor modifying a CPU register of the hardware processor, the protection system and the secure enclave being connected to the additional units.

11 Claims, 3 Drawing Sheets

(51) Int. Cl.
*G06F 21/56*       (2013.01)
*G06F 21/57*       (2013.01)
*G06F 21/86*       (2013.01)

(56)                References Cited

U.S. PATENT DOCUMENTS

| | | | | |
|---|---|---|---|---|
| 10,657,265 | B1 * | 5/2020 | Poolla ................... | G06F 3/0619 |
| 2008/0238612 | A1 * | 10/2008 | Carpenter ............ | G06F 21/575 |
| | | | | 340/5.74 |
| 2010/0107246 | A1 * | 4/2010 | Ohta ...................... | G06F 21/52 |
| | | | | 726/22 |
| 2010/0182147 | A1 * | 7/2010 | Rueping ................ | G06F 21/86 |
| | | | | 340/541 |
| 2011/0004771 | A1 * | 1/2011 | Matsushima ......... | G06F 21/554 |
| | | | | 713/189 |
| 2014/0089650 | A1 * | 3/2014 | Polzin .................... | G06F 21/81 |
| | | | | 713/2 |
| 2014/0359239 | A1 | 12/2014 | Hiremane | |
| 2016/0283937 | A1 * | 9/2016 | Reese ................ | G06Q 20/4012 |
| 2017/0076116 | A1 * | 3/2017 | Chen ...................... | G06F 21/554 |
| 2017/0262352 | A1 * | 9/2017 | Jeansonne ............ | G06F 21/566 |
| 2018/0157572 | A1 * | 6/2018 | Grieco ................ | G06F 11/3031 |
| 2018/0239905 | A1 * | 8/2018 | Liu ........................ | G06F 21/577 |
| 2019/0042802 | A1 * | 2/2019 | Trikalinou ............ | G06F 21/554 |
| 2019/0172047 | A1 * | 6/2019 | Tan ..................... | G06Q 20/3563 |
| 2019/0277912 | A1 * | 9/2019 | Panesar ................. | G01R 31/66 |
| 2019/0303585 | A1 * | 10/2019 | Ofek .................... | G06F 21/577 |
| 2020/0242276 | A1 * | 7/2020 | Klein .................... | G06F 21/554 |

OTHER PUBLICATIONS

PCT/EP2019/061290, International Search Report, May 16, 2019, European Patent Office, P.B. 5818 Patentlaan 2 NL—2280 HV Rijswijk.

* cited by examiner

S1

S2

ELECTRONIC SYSTEM AND METHOD FOR PREVENTING MALICIOUS ACTIONS ON A PROCESSING SYSTEM OF THE ELECTRONIC SYSTEM

FIELD OF THE INVENTION

The present invention relates to the field of chip protection against attacks, and more particularly to a method and a corresponding device enabling a secure enclave of a chip to protect the whole chip when it detects such an attack.

BACKGROUND OF THE INVENTION

In order to protect sensitive data handled in a computer system, such as cryptographic keys used for encryption and decryption or for signing messages, execution of malicious software code on the system shall be prevented.

In order to do so, a secure boot feature has been proposed, which makes a certified bootloader load another software only after a successful check of its integrity and/or authenticity. Enabling any software to be loaded only after such verifications by an already approved software builds a chain of trust preventing any loading in memory of malicious software.

Unfortunately, such a feature is not able to protect a computer system against modifications of a software loaded in memory after it has been validated by the piece of software which loaded in.

In order to protect a chip against such modifications, it is needed to monitor the behavior of the chip in order to detect any unexpected behavior which could result from a compromise of the chip.

In the case of a System-On-Chip (SoC), a first existing implementation of such a monitoring is to include in the chip to be protected an additional integrated circuit continuously checking the behavior of the chip and taking actions protecting the chip when an unexpected behavior has been detected. Such a solution, to be efficient, requires a significant area of the chip to be protected to be dedicated to the additional integrated circuit performing such a monitoring, because of the need of accessing all parts of the chip to be protected; this may be an issue in SoC having very little free "silicium space". Moreover, this additional integrated circuit may itself get compromised.

A second existing solution is to have such a monitoring performed by a secure enclave already included in the SoC. The main drawback of such a solution is that such a secure enclave usually has no control over the rest of the chip and may only communicate with the rest of the chip, for example with an OS running on a main CPU of the chip, by exchanging messages with it. As a result, such a secure enclave may only send warnings or requests to the rest of the chip, which may be simply ignored when the chip has been compromised and instructed to do so.

Consequently, there is a need for a device and an associated method, enabling to detect an abnormal behavior of a chip and to apply countermeasures to all components of the chip, without increasing much the size of the integrated circuits of the chip.

SUMMARY OF THE INVENTION

For this purpose and according to a first aspect, this invention therefore relates to an electronic system comprising:

a processing system comprising a hardware processor and at least one additional unit, wherein said hardware processor comprises at least one CPU register and said additional unit comprises a processing system memory, a secure enclave configured to monitor the behavior of the processing system and detect a compromise of the processing system, a protection system configured, upon detection of a compromise of the processing system by the secure enclave, to perform at least one dedicated action on at least one additional unit among said additional units for raising an alert or for applying countermeasures, or on said hardware processor modifying a CPU register of the hardware processor, said protection system and said secure enclave being connected to said additional units.

Such an architecture enables to detect that the processing system has been compromised and to take actions to prevent malicious actions on the processing system with a limited impact on the electronic system, especially when the electronic system already includes a secure enclave for other purposes.

In a first embodiment wherein said additional units comprise a reset unit, the protection system may be configured, upon detection of a compromise of the processing system by the secure enclave, to send to the reset unit a reset command triggering a reset of the processing system.

Such a reset enables to restart the processing system, and to apply security features that are active at startup such as the secure boot feature.

In a second embodiment, the protection system may be configured, upon detection of a compromise of the processing system by the secure enclave, to erase an area of the processing system memory or the whole processing system memory.

By doing so, any malicious data or program loaded in the memory by an attacker who compromised the processing system is erased. Such an erasure may also be used to erase sensitive data stored in the memory, such as cryptographic keys, before the attacker gets access to it.

In a third embodiment wherein said additional units comprise a communication interface configured to be connected to a communication network, the protection system may be configured, upon detection of a compromise of the processing system by the secure enclave, to send a warning command to said communication interface triggering a transmission of a warning message to an external authority through said communication network.

It enables this external authority to take appropriate measures for preventing malicious actions on the processing system and eventually restoring the processing system to its normal state and behavior.

The electronic system may be a System-on-Chip (SoC).

In a first embodiment, said protection system is a dedicated integrated circuit external to said secure enclave and connected to the secure enclave.

In a second embodiment, said protection system is included in the secure enclave.

The secure enclave may be a secure mode or secure area of the hardware processor or a dedicated tamper proof integrated circuit such as an integrated Secure Element.

In both cases, it enables to use as secure enclave elements of the electronic system that may already be integrated in the electronic system, as it is available "off the shelf", therefore lowering the impact on its size, as well as the efforts needed to integrate the secure enclave in the electronic system.

According to a second aspect, this invention relates to a method for preventing malicious actions on a processing system of an electronic system according to the first aspect of the invention, performed by said electronic system comprising:

monitoring the behavior of the processing system and detecting, by the secure enclave, a compromise of the processing system, performing, by the protection system, at least one dedicated action on at least one additional unit among said additional units for raising an alert or for applying countermeasures or on said hardware processor modifying a CPU register of the hardware processor.

In a first embodiment of the method according to the second aspect of the invention:

the step of detecting a compromise of the processing system comprises:

determining at least one dedicated action on at least one additional unit among said additional units for raising an alert or for applying countermeasures, or on said hardware processor modifying a CPU register of the hardware processor, and sending to the protection system an order triggering said dedicated action, the step of performing at least one dedicated action comprises:

performing said dedicated action ordered by the secure enclave.

Such a method has the same advantages as the electronic system described above. It enables the secure enclave, upon detection of the compromise, to trigger an action on the hardware processor or the additional units of the processing system preventing further malicious actions on the processing system.

In a second embodiment of the method according to the second aspect of the invention, wherein said electronic system comprises a data exchange memory connected to said secure enclave and said protection system:

the step of detecting a compromise of the processing system comprises:

writing in said data exchange memory a value evaluating the seriousness of said compromise of the processing system, the step of performing at least one dedicated action comprises:

reading said value evaluating the seriousness of said compromise of the processing system in said data exchange memory, determining depending, on the read value, at least one dedicated action on at least one additional unit among said additional units for raising an alert or for applying countermeasures or on said hardware processor modifying a CPU register of the hardware processor and, performing said determined action.

Such an embodiment enables to choose a protection policy, defining the kind of action to be performed for a given level of compromise, independently of the secure enclave which is only involved in the detection of the compromise and not in the choice of the actions to be performed.

In a third embodiment of the method according to the second aspect of the invention wherein said electronic system also comprises a data exchange memory connected to said secure enclave and said protection system:

the step of detecting a compromise of the processing system comprises:

determining and writing in said data exchange memory at least one dedicated action on at least one additional unit among said additional units for raising an alert or for applying countermeasures, or on said hardware processor modifying a CPU register of the hardware processor, the step of performing at least one dedicated action comprises:

reading said at least one dedicated action in said data exchange memory, and performing said at least one dedicated action read in the data exchange memory.

A main software program being run by the hardware processor, the step of detecting a compromise of the processing system may comprise verifying the behavior of the main software program.

It enables the electronic system to react to a compromise of its main software program.

The step of detecting a compromise may be continuously performed or periodically scheduled.

According to a third aspect, this invention relates to a computer program product directly loadable into the memory of at least one computer, comprising software code instructions for performing the steps of the method according to the second aspect of the invention when said product is run on the computer.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

According to a first aspect, the invention relates to an electronic system 1, able to detect by himself an unexpected behavior it may have, which may be the consequence of an attack, and able to react to such a detection by taking actions, such as countermeasures, preventing further malicious actions on the electronic system.

Such an electronic system 1 may for example be a System-on-Chip (SoC). Alternatively, it may be a computer system housing multiple electronic parts such as a PC.

Figure 1:
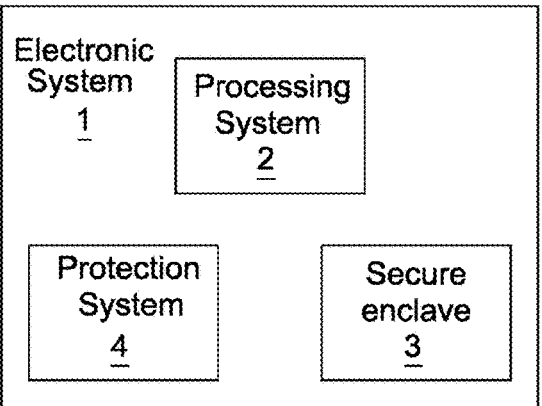
FIG. 1 is a schematic illustration of an electronic system according to the present invention.

As described on FIG. 1, such an electronic system 1 includes a processing system 2, to be protected against being compromised.

Figure 2A:
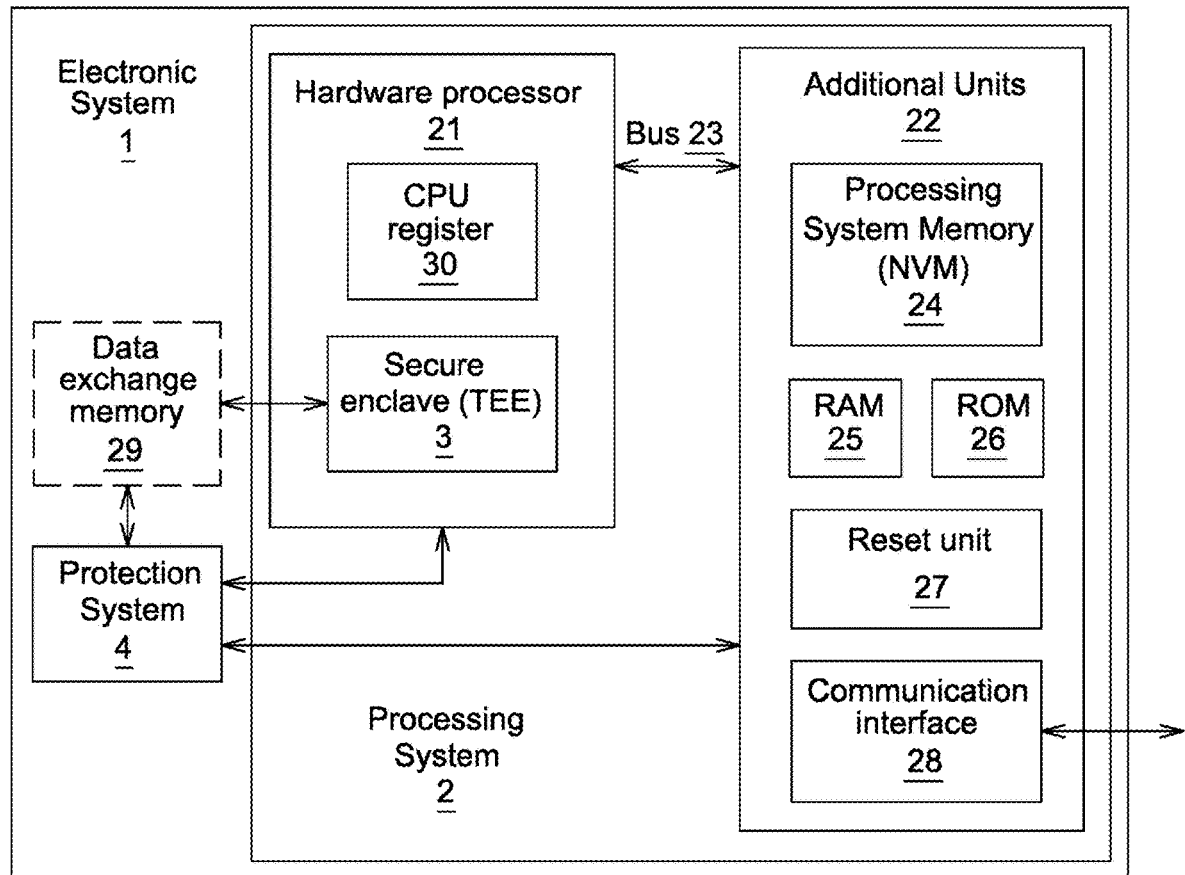
FIGS. 2a and 2b are schematic illustrations of an electronic system according to a first and a second embodiments of the present invention.
Figure 2B:
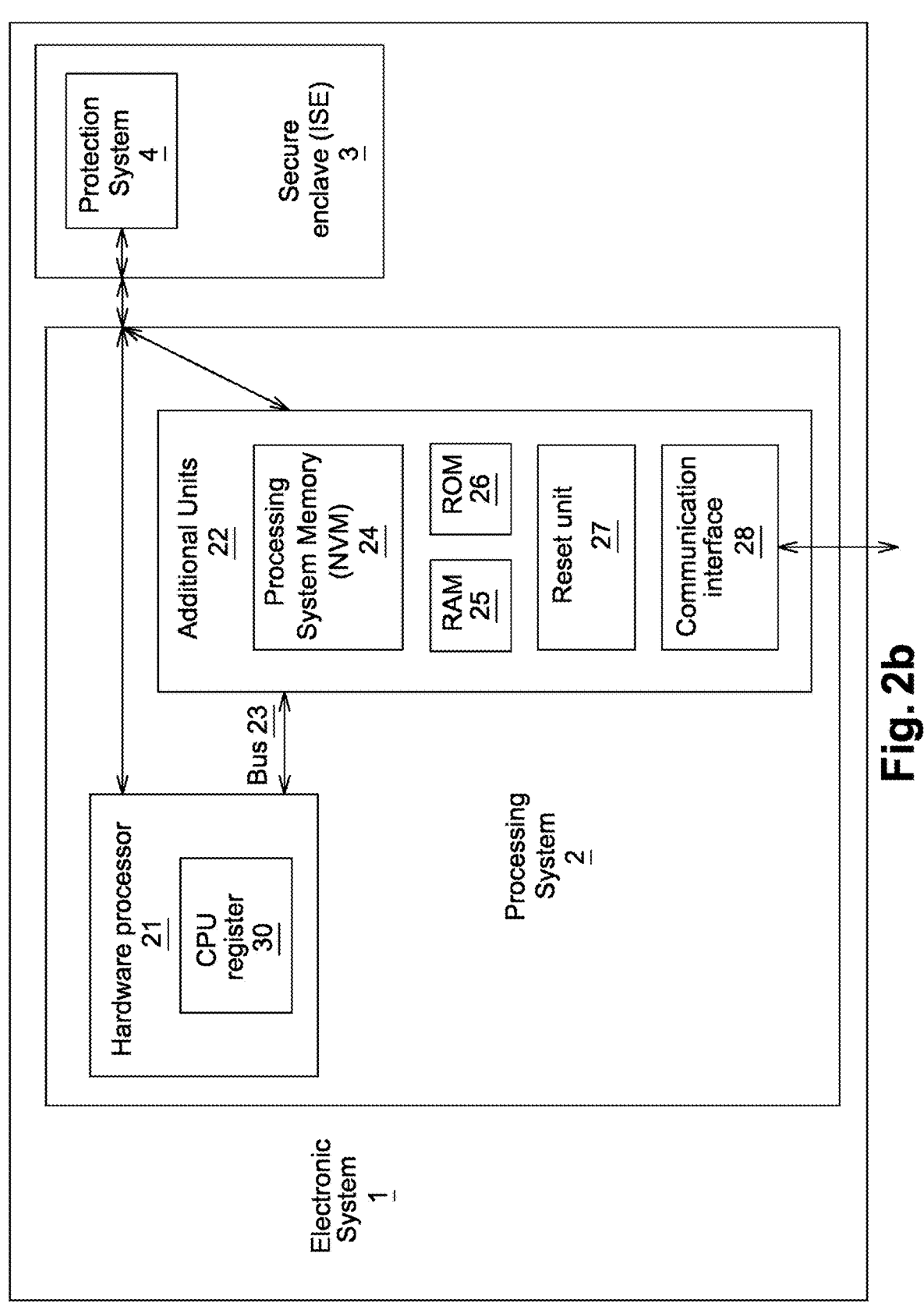

FIGS. 2*a* and 2*b* illustrate schematically the processing system 2. Such a processing system 2 includes a hardware processor 21, one or more additional units 22, and a bus 23 connecting together the hardware processor and the additional units. The hardware processor 21 comprises at least one CPU register 30.

Among these additional units, the processing system includes at least one processing system memory 24. Such a processing system memory may for example be a non-volatile memory (NVM).

The processing system may also include as additional units a random access memory (RAM) 25, a read-only memory (ROM) 26, registers external to the hardware processor, a reset unit 27, and a communication interface 28. Such a communication interface may be used to connect the processing system to various forms of wireless networks, e.g., wide-area networks, WiFi networks, or mobile telephony networks. Alternatively, the processing system may connect to networks via wired network connections such as Ethernet.

The electronic system 1 also includes a secure enclave 3 which is configured to monitor the behavior of the processing system and detect a compromise of the processing system.

In a first embodiment, illustrated on FIG. 2*a*, the secure enclave is a secure mode or secure area of the hardware processor. It may for example be used to run an implementation of a Trusted Execution Environment (TEE). Optionally, the secure enclave may also be located across the hardware processor and the additional units.

In a second embodiment, illustrated on FIG. 2*b*, the secure enclave is a dedicated tamper proof integrated circuit, apart from the processing system. It may for example be an integrated Secure Element (iSE) connected to the processing system.

In order to enable it to monitor the behavior of the processing system, the secure enclave is connected to the elements of the processing system he is not a part thereof, such as the additional units and the hardware processor. The expression "connected" used here may either refer to a direct connection or to a connection through one or more other circuits. It has the same meaning in the rest of the application.

The electronic system also includes a protection system 4 which is configured upon detection of a compromise of the processing system by the secure enclave, to perform at least one dedicated action on at least one additional unit among said additional units for raising an alert or for applying countermeasures, or on said hardware processor modifying the state of the processing system by modifying a CPU register 30 of the hardware processor.

In a first implementation, as illustrated on FIG. 2*b*, the protection system is included in the secure enclave.

In a second implementation, the protection system is a dedicated integrated circuit external to the secure enclave and connected to the secure enclave as illustrated on FIG. 2*a*.

In order to enable it to perform actions on the additional units, or on a CPU register of the hardware processor, the protection system is also connected to the additional units of the processing system, and to the hardware processor when it is not included therein.

As a result, such an electronic system includes both a secure enclave able to detect a compromise of the processing system and being immune to such a compromise, and a protection system able to take actions preventing malicious actions on the processing system.

The various implementations discussed above have a very low footprint, as well as a low invasiveness, on an existing electronic system already having a secure enclave since the only piece of hardware to be added is the protection system which only ensure quite simple functions.

Figure 3:
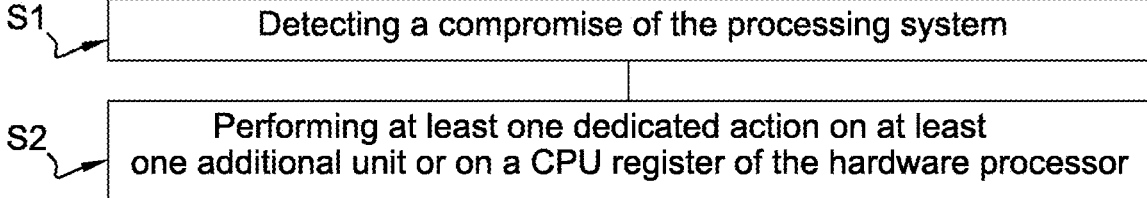
FIG. 3 is a schematic illustration of a method for preventing malicious actions on a processing system of an electronic system according to an embodiment of the present invention.

According to a second aspect, the present invention also relates to a method for preventing malicious actions on such a processing system. The steps of this method are described in the following paragraphs and depicted on FIG. 3.

In a first step S1, the secure enclave detects a compromise of the processing system.

Such a detection may for example include verifying the behavior of a main software program run by the hardware processor. Such a main software may for example be a Rich OS executed by the processing system. In order to do so, the secure enclave may act as a redundant CPU performing the same operations as the ones performed by the hardware processor and it may perform consistency checks between its own outputs and outputs of the hardware processor.

As another example, such a detection may include verifying the integrity of the content of the processing system memory 24 or the random access memory (RAM) 25. In that case, a reference hash value of the content of the memory may have been previously computed and stored in the secure enclave.

As another example, such a detection may include checking the correct behavior of peripherals of the hardware processor, as for instance a Random Number Generator, as well as the correct behavior of drivers calling them.

Such a verification may be continuously performed, or may be periodically scheduled or may be triggered by an external event such as a verification request received from a user or an external authority.

In a second step S2, triggered by the detection of a compromise of the processing system, the protection system performs then at least one dedicated action on at least one additional unit among said additional units for raising an alert or for applying countermeasures, or on said hardware processor 21 modifying a CPU register 30 of the hardware processor.

In a first embodiment, upon detection of a compromise of the processing system by the secure enclave, the protection system may send to the reset unit 27 a reset command triggering a reset of the processing system. By doing so, the whole electronic system is reset and it is restored to a safe configuration, or, in case the content of a non-volatile memory has been compromised, such a compromise may be detected after the reset by a verification feature such as the secure boot feature. Optionally, the reset sequence may include a power-off phase, whose duration may be such that the content of the volatile memories of the processing system is erased.

In a second embodiment, upon detection of a compromise of the processing system by the secure enclave, the protection system may erase an area of the processing system memory 24 or the whole processing system memory 24. By doing so, any malicious data or program loaded in the memory by the attacker who compromised the processing system is erased. Such an erasure may also be used to erase sensitive data stored in the memory, such as cryptographic keys, before the attacker gets access to it.

In a third embodiment, upon detection of a compromise of the processing system by the secure enclave, the protection system may send a warning command to the communication interface triggering a transmission of a warning message to an external authority through a communication network to which the communication interface 28 is connected.

In a fourth embodiment, upon detection of a compromise of the processing system by the secure enclave, the protection system may modify the state of the processing system, for example by modifying the content of a register of the processing system. Such a register may be a CPU register included in the hardware processor, or an external register included in the additional units.

For example, if the memories of the processing system are encrypted, the protection system may modify the content of a register storing a decryption key of the RAM of the processing system. This makes the content of the RAM unreadable and therefore protected.

As another example, the processing system may clear output buffers of the processing system in order to avoid any leakage of sensitive information through these buffers.

As another example, the processing unit may change the content of a MMU/MPU register to make a MMU/MPU of the processing system work in a different mode, less favorable to an attacker.

As another example, the protection system may write a specific value in a stack pointer or program counter register of the processing system so that the processing system performs a reset or executes a function performing a cleanup of the processing system. The specific value may be designed to lead to a hardware error so that the processing system raises an exception.

The processing system may be configured to take different actions or perform a combination of such actions depending on how serious the event detected by the secure enclave is. For example when the event detected by the secure enclave is not very serious, the processing system may just perform a reset, while in case of a more serious compromise, the processing system may erase the whole processing system memory. This scaled approach enable to take actions which remain proportionate to the level of threat associated to the detected compromise.

Various implementations are possible for making the protection system react to a detection of an abnormal behavior performed by the secure enclave.

In a first embodiment, the secure enclave 3 is able to directly trigger an action of the protection system.

In such a case, the first step S1 of detecting a compromise of the processing system, performed by the secure enclave, comprises:
- a first action selection step during which the secure enclave determines at least one dedicated action on at least one additional unit for raising an alert or for applying countermeasures, or on said hardware processor modifying a CPU register of the hardware processor.

and an order step during which the secure enclave sends to the protection system an order triggering the dedicated action determined at the previous step.

In such an embodiment, the second step S2 performed by the protection system, of performing at least one dedicated action, may comprise a first action step during which the protection system performs the dedicated action ordered by the secure enclave.

In a second and a third embodiment, there is no direct communication between the protection system and the secure enclave.

In such embodiments, as illustrated on FIG. 2*a*, the electronic system may comprise a data exchange memory 29 connected to the secure enclave and to the protection system. Such a data exchange memory may for example be any kind of volatile or non-volatile memory or a register.

In the second embodiment, the first step S1 of detecting a compromise of the processing system, performed by the secure enclave, may just comprise writing in said data exchange memory a value evaluating the seriousness of the compromise of the processing system.

Then the second step S2 performed by the protection system, of performing at least one dedicated action, may comprise:
- a reading step during which the protection system reads the value evaluating the seriousness of the compromise of the processing system in the data exchange memory,
- a second action selection step during which the protection system determines, depending on the read value, at least one dedicated action on at least one additional unit for raising an alert or for applying countermeasures, or on said hardware processor modifying a CPU register of the hardware processor,
- an action step during which the protection system performs the actions determined at the previous step.

In the third embodiment, during the first step S1, the secure enclave writes in the data exchange memory said at least one dedicated action to be performed by the protection system.

In such a case, the second step S2 comprises:
- a reading step during which the protection system reads in the data exchange memory said at least one dedicated action,
- an action step during which the protection system performs the actions read in the data exchange memory during the reading step.

According to a third aspect, the invention relates to a computer program product directly loadable into the memory of at least one computer, comprising software code instructions for performing, when said product is run on the computer, the steps of the method described here before.

In addition to these features, the method and the computer program according to the second and third aspects of the invention may be configured for performing or may comprise any other features described here before.

The electronic system and method presented here therefore enable to detect a compromise or abnormal behavior of the processing system and to take actions preventing malicious actions on the processing system, while having a very low footprint on an existing electronic system already having a secure enclave.

The invention claimed is:

1. A system on a chip wherein components of the system are co-located on the chip, the system on the chip comprising:
   a processing system located on the chip and comprising a hardware processor and at least one additional unit, wherein said hardware processor comprises at least one CPU register and said at least one additional unit comprises a processing system memory,
   a secure enclave co-located with the processing system on the chip configured to continuously monitor and verify behavior of a software program run by the processing system to detect compromise of the processing system,
   a protection system co-located with the processing system on the chip, directly connected to the processing system, and external to the processing system and configured, upon the detection of the compromise of the processing system by the secure enclave, to send to a reset unit of said at least one additional unit a reset command triggering a reset of the processing system, or to erase an area of the processing system memory,
   said protection system and said secure enclave being connected to said at least one additional unit.

2. The system on the chip of claim 1, wherein the protection system is configured, upon detection of compromise of the processing system by the secure enclave, to erase said area of the processing system memory, and said area comprises the whole processing system memory.

3. The system on the chip of claim 1, wherein said protection system is a dedicated integrated circuit external to said secure enclave and connected to the secure enclave.

4. The system on the chip of claim 1, wherein said secure enclave is external to said processing system and said protection system is included in the secure enclave.

5. The system on the chip of claim 1, wherein the secure enclave is a secure mode or secure area of the hardware processor.

6. The system on the chip of claim 1, wherein the secure enclave is a dedicated tamper proof integrated circuit.

7. The system on the chip of claim 6, wherein the secure enclave is an integrated Secure Element.

8. The system on the chip of claim 1 wherein to monitor behavior of the processing system and to detect compromise of the processing system, said secure enclave acts as a redundant CPU performing same operations equivalent to operations performed by the hardware processor of said processing system and performs consistency checks between outputs from the secure enclave and outputs of the hardware processor.

9. The system on the chip of claim 1 wherein said secure enclave is configured to verify integrity of a selected memory selected from the processing system memory and a random access memory of the processing system by storing, in the secure enclave, a reference hash value of content of the selected memory.

10. The system on the chip of claim 1 wherein the secure enclave performs redundant execution of the software program and performs consistency checks between outputs from the execution of the software program by the secure enclave and outputs of the processing system.

11. A method for preventing malicious actions on a processing system of a system on a chip, the processing system located on the chip and having a hardware processor and at least one additional unit, the system on the chip further having a secure enclave located on the chip and a protection system located on the chip, directly connected to the processing system, and external to the processing system, the method performed by said system on the chip, the method comprising:
   continuously monitoring and verifying, by the secure enclave, behavior of a software program run by the processing system to detect, by the secure enclave of the system on the chip, compromise of the processing system, and upon the detection of the compromise, triggering the protection system to perform at least one dedicated action on at least one of said at least one additional unit for applying countermeasures;
   performing, by the protection system of the system on the chip, via said direct connection, upon the triggering by the secure enclave, the at least one dedicated action on at least one of said at least one additional unit for applying the countermeasures by sending to a reset unit of said at least one additional unit a reset command triggering a reset of the processing system, or erasing an area of a memory of the processing system of the system on the chip.

* * * * *